Figure 1:
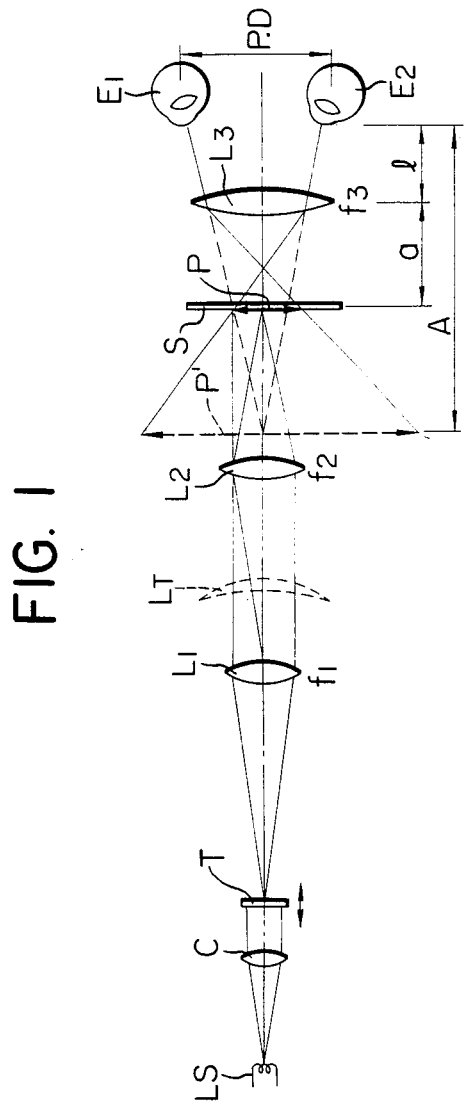

United States Patent [19]

Yoshino et al.

[11] Patent Number: 4,564,291
[45] Date of Patent: Jan. 14, 1986

[54] PROJECTION TYPE LENSMETER

[75] Inventors: Hisakazu Yoshino; Masayuki Takasu; Junji Kuroiwa, all of Tokyo, Japan

[73] Assignee: Tokyo Kogaku Kikai Kabushiki Kaisha, Tokyo, Japan

[21] Appl. No.: 214,624

[22] Filed: Dec. 10, 1980

[30] Foreign Application Priority Data

Dec. 19, 1979 [JP] Japan ................................ 54-165086

[51] Int. Cl.$^4$ .......................................... G01M 11/02
[52] U.S. Cl. ............................................... 356/125
[58] Field of Search ................ 356/124, 125, 126, 127

[56] References Cited

U.S. PATENT DOCUMENTS

| 2,640,392 | 6/1953 | Freeman | 356/125 |
| 4,247,200 | 1/1981 | Nohda et al. | 356/124 |

FOREIGN PATENT DOCUMENTS 55-101840  4/1980  Japan .................... 356/124

*Primary Examiner*—R. A. Rosenberger
*Attorney, Agent, or Firm*—Brumbaugh, Graves, Donohue & Raymond

[57] ABSTRACT

A projection type lensmeter in which the target image for measuring the refractive power of a lens is projected on a screen and the projected image is magnified and observed through a magnifying observation optical system including a collimator lens having a focal length $f_1$ adapted to collimate light projected from the target image, and a projection lens having a focal length $f_2$ adapted to project light from the target image to the screen. The magnifying observation optical system has an effective diameter $\phi$ and a magnification $m_2$. The focal lengths $f_1$ and $f_2$, the effective diameter $\phi$, and the magnification $m_2$ satisfy the following relations:

$$25 \text{ mm} \leq f_1 \leq 30 \text{ mm}$$

$$409 \text{ mm} \leq f_2 \leq 600 \text{ mm}$$

$$60 \text{ mm} \leq \phi \leq 70 \text{ mm}$$

$$1.25 \leq m_2 \leq 1.83.$$

The overall magnification of the lensmeter is 30 or greater.

1 Claim, 2 Drawing Figures

PROJECTION TYPE LENSMETER

The present invention relates to a projection type lens meter and, more particularly, to a projection type lens meter in which the target image for measuring the refractive power of a lens to be examined is projected on a screen and the projected image is magnified and observed through a magnifying observation optical system.

The lens meter, which is used for measuring the refractive powers of glass lenses for correcting extraordinary refraction of an eye lens, e.g. hypermetropia, pseudomyopia, astigmia and so forth, is broadly classified into two types, namely a telescope type and a projection type.

The telescope type lens meter has found widespread use because of its small size and low price, and because of its long historical performance.

In recent years, however, in view of the development and application of a digital display technique for prescriptive display of measured values, the projection type lens meter has won greater attention because this type of lens meter permits the measuring target and the digital display to be observed simultaneously and by both eyes.

With the telescope type lens meter, the individual taking the measurements may use only a single eye, and a dioptric power adjustment must be made for each measurement in order to eliminate a measurement error. In contrast, the projection type lens meter permits a measurement to be made through both eyes. In addition, the projection type lens meter is free of errors in optical center measurement and cylindrical lens axis measurement due to a parallax caused by the viewing direction through the eyepiece in the telescope type lens meter.

The projection type lens meter is required, however, to project the measuring target on the screen at a desired magnification of usually 30 to 50, so that an objective lens having an impractically long focal length is needed to magnify the image of the target formed by the lens to be examined. A large screen area also is necessary. Therefore, various attempts have been made to reduce the size of the lens meter as a whole, by bending the path of light using a plurality of reflecting mirrors. The increased number of reflecting mirrors makes the adjustment of the optical axis correspondingly difficult. In addition, the reflecting mirror closest to the screen inevitably has a large area and, hence, involves distortion of the image and degradation of the same due to warp or deflection of the mirror.

In order to overcome the above-described problems while enjoying the advantages of the projection type lens meter, there has been proposed in the preceding Japanese Patent Application No. 54-9543 which has been filed on Jan. 30, 1979 and disclosed for public inspection on Aug. 4, 1980 under the disclosure number 55-101840 and which has been assigned to assignee of the present application a projection type lens meter having a magnifying observation optical system for further magnifying the image of the target projected on the screen through the lens to be examined. According to this arrangement, the overall magnification is given as the composite magnification of the projection optical system and the observation optical system, so that the size of the lens meter as a whole can be reduced considerably.

The present invention seeks to provide a special condition in such a projection type lens meter having a magnifying observation optical system, concerning the share of the magnification by both the projection and magnifying observation optical systems, while exphasizing the two-eye observation of the measurer, particularly the effective field of vision, a convergence adjustment applied to the eyes of the measurer in relation to the measuring distance, as well as good operability during measurement.

According to the present invention, there is provided a projection type lensmeter comprising a lens mount for mounting a lens to be examined, a target-projecting optical system for projecting the target projection light through said lens on said lens mount and for magnifying and focussing said light on a screen, and an observation optical system for magnifying and observing the target image on said screen, said target-projecting optical system including a collimater lens having a focal length $f_1$ and adapted to collimate said target projection light, and a projection lens having a focal length $f_2$ and adapted to project the target projection light beam on said screen, said observation optical system having an effective diameter $\phi$ and a magnification $m_2$, said focal lengths $f_1$, $f_2$, effective diameter $\phi$ and magnification $m_2$ satisfying the following relations of:

$$25 \text{ mm} \leq f_1 \leq 30 \text{ mm}$$

$$409 \text{ mm} \leq f_2 \leq 600 \text{ mm}$$

$$60 \text{ mm} \leq \phi \leq 70 \text{ mm}$$

$$1.25 \leq m_2 \leq 1.83$$

the overall magnification of said lens meter being 30 or greater.

Figure 2:
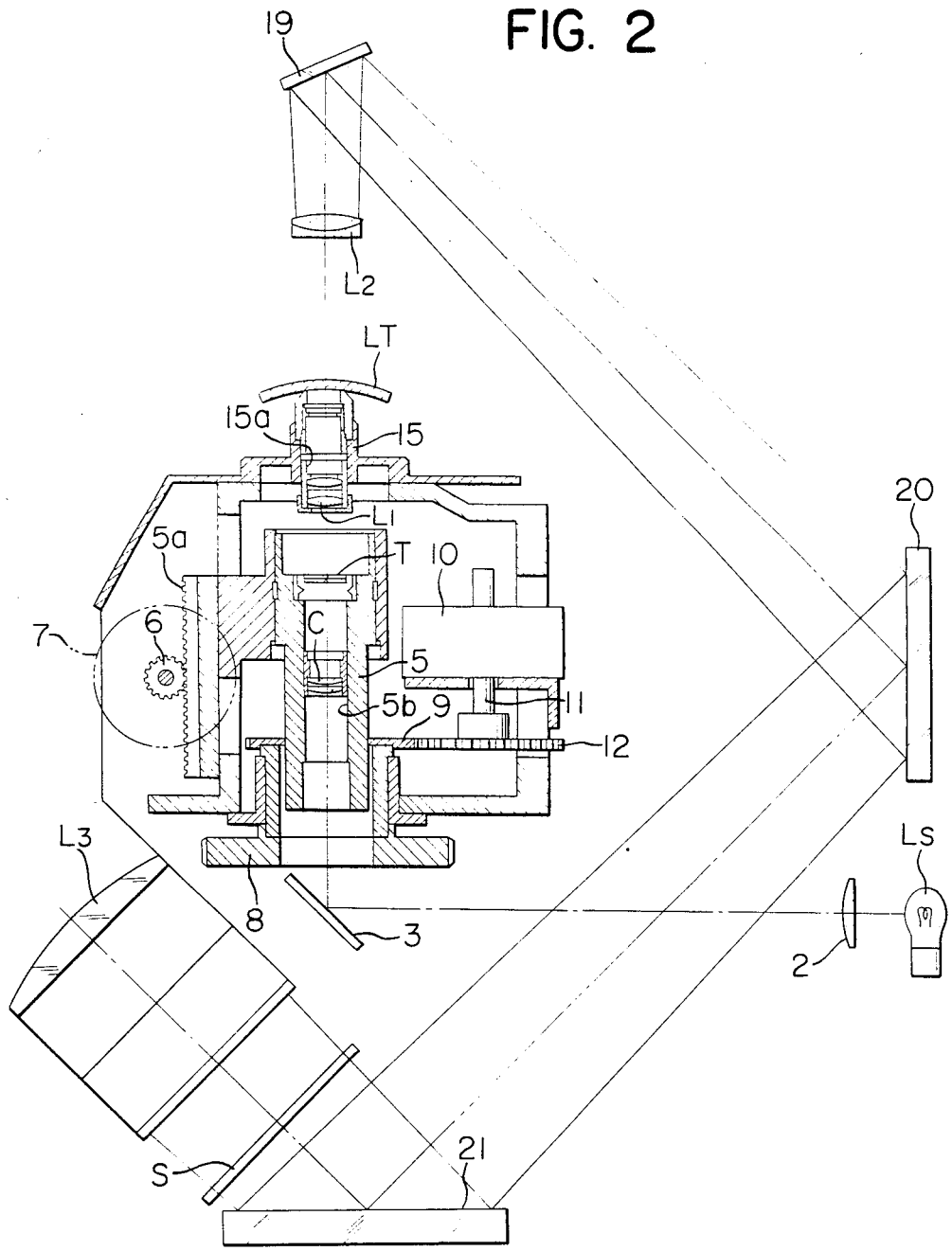

In order that the invention be more clearly understood, descriptions will now be made taking reference to the accompanying drawings, in which;

FIG. 1 is a schematical illustration of an optical arrangement of a projection type lens meter constructed in accordance with one embodiment of the present invention; and FIG. 2 is a sectional view of a lensmeter having the optical system shown in FIG. 1.

Referring to the drawings, particularly to FIG. 1, LS represents a light source for illuminating the target T through a condenser lens C, while $L_1$ designates a collimator lens having a focal length $f_1$. Also, the lens to be examined is represented by $L_T$, while an objective lens having a focal length $f_2$ is designated at $L_2$. Symbol S shows a screen on which the target image is projected. A magnifying lens having a focal length $f_3$ and adapted for the observation of the target image projected on the screen is denoted by $L_3$. Symbols $E_1$ and $E_2$ represent the right and left eyes of the measurer, respectively.

In use, the light emitted from the light source LS to illuminate the target is formed into parallel light flux by the collimeter lens $L_1$. When there is no lens $L_T$ to be examined, the parallel light flux is incident upon the objective lens $L_2$ and forms an angle on the screen S which is located at the focal point of the objective lens $L_2$. The target image formed on the screen is magnified by the magnifying lens $L_3$ and is incident upon the eyes $E_1$, $E_2$ of the measurer so that the magnified image may be observed.

As the lens $L_T$ to be examined is placed in position, the parallel light flux exiting from the collimeter lens $L_1$ is converged or diverged depending on the refractive power of the lens $L_T$ before it is incident upon the objective lens $L_2$, so that the image is not focussed on the screen located at the focal point of the objective lens $L_T$. Namely, the target image is observed as being out of focus by the measurer. Then, the measurer moves the target back and forth along the optical axis and effects an adjustment in such a manner that the light flux from the lens $L_T$ to be examined is incident upon the objective lens $L_2$ in the form of the parallel light flux to form the target image on the screen S.

The amount of movement of the target in this state corresponds to the refractive power of the lens $L_T$ to be examined, so that the refractive power of the lens $L_T$ is known from the amount of movement of the target. The actual construction of the lens meter is the same as that described and illustrated in Japanese Patent Application No. 9543/1979.

The magnification M of the projection type lens meter is given as the product of the magnification $m_1$ of the projection optical system including the collimeter lens $L_1$ and the objective lens $L_2$, and the magnification $m_2$ of the observation optical system for observation of the screen image at the magnification $m_2$, i.e. M is given by the following equation:

$$M = m_1 \cdot m_2 \tag{1}$$

The magnification $m_1$ is given as the ratio between the focal length $f_1$ of the collimeter lens and the focal length $f_2$ of the objective lens, namely by the following equation:

$$m_1 = f_2/f_1 \tag{2}$$

Also, the magnification $m_2$ of the observation optical system is represented by the following equation:

$$m_2 = \frac{D}{f_3}\left(1 + \frac{f_3 - l}{A}\right) \tag{3}$$

The symbol l represents the distance between the magnifying lens $L_3$ and the eye of the measurer, while A represents the distance between the measurer's eye and the virtual image P' of the target image P formed on the screen.

The symbol D represents the distance between the reference object and the eye, and is usually represented as the distance of distinct vision and expressed generally as D=250 m/m. According to the invention, this distance is expressed as follows, as the sum of the distance a between the magnifier lens and the target image P focussed on the screen S and the distance l between the magnifying lens and the measurer's eye $E_1$, $E_2$.

$$D = a + l \tag{4}$$

Needless to say, $f_3$ represents the focal distance of the magnifying lens $L_3$.

Since the distance a is given by $$a = \frac{A - l}{A + f_3 - l} f_3,$$

the following equation is derived from the foregoing equations (4) and (3)

$$m_2 = 1 + \frac{l(A - l)}{f_3 A} \tag{5}$$

Owing to the characteristic of the collimeter lens $L_1$, the sensitivity of measurement of the lens to be examined increases as the focal length $f_1$ increases. However, it is quite contrary to the aim of the invention, i.e. to reduce the size of the lens meter, to increase, without any restriction, the focal length of the lens to be examined. In consequence, in view of the requirements of measuring accuracy and the size of the lens meter, the focal length $f_1$ is selected as follows:

$$f_1 = 25 \text{ to } 30 \text{ m/m} \tag{6}$$

On the other hand, considering the magnifying optical system of the observation optical system, the l and A in equation (5) should allow the measurer to perform measurements in a comfortable posture. In addition, it is desired that the distance between the lens mount mounting the lens to be examined, the manipulation section and the measured value display section and the measurer's eye, be equal to the distance A between the measurer's eyes and the virtual image of the target image observed through the magnifying lens $L_3$, as in the case of the lens meter disclosed in Japanese Patent Application No. 9543/1979. This requisite has great significance because, by arranging it such that the measurer observes the lens mount, manipulation section, measured value display section and the virtual image at an equal visual distance, the measurer can comfortably perform a measurement without requiring adjustment of the measurer's eyes for each measurement.

The distances l and A, therefore, are selected as follows:

$$l = 300 \text{ m/m}$$
$$A = 400 \text{ m/m} \tag{7}$$

The F number of the magnifying lens is preferably selected as follows, in view of its aberration:

$$F \geq 1.5 \tag{8}$$

Regarding the effective diameter $\phi$ of the magnifying lens $L_3$, it is preferred that the relationship expressed by $PD \leq \phi$ exist between the diameter $\phi$ and the distance PD between eyes of the measurer. However, too large a diameter $\phi$ is not preferred from in view of the lens meter size reduction which is the aim of the present invention. Since the distance PD is usually between 60 and 80 m/m, the distance PD is determined as follows:

$$60 \leq \phi \leq 80 \tag{9}$$

The focal distance $f_3$ of the magnifying lens and the magnifications $m_1$ and $m_2$ of the projection optical system and the observation optical system are determined in accordance with the equations (8), (9) and (5), by substituting the value of equation (7) into these equations, with various values taken as the effective diameter $\phi$. The result is shown in Table 1. It is assumed here that the magnifications $m_1$ and $m_2$ meet the conditions of equation (1), while the overall magnification of the lens meter meets the following relation which is imposed as the magnification of lens meters in practice:

$$30 \leqq M \quad (10)$$

TABLE 1

| $\phi$ | $f_3$ | $m_1$ | $m_2$ |
|---|---|---|---|
| 60 m/m | $\geqq$ 90 m/m | 16.36 | 1.83 |
| 70 m/m | $\geqq$ 105 m/m | 17.50 | 1.71 |
| 80 m/m | $\geqq$ 120 m/m | 18.46 | 1.63 |

As has been described, the focal distance $f_3$ is determined from the requirement of the measuring distance of the measurer, i.e. the requirement in the manipulation of the lens meter, and from the effective diameter $\phi$ of the magnifying lens $L_3$ which is limited in view of the distance PD between eyes of the measurer and the aberration. Then, the magnifications $m_1$ and $m_2$ of the projection optical system and the observation optical system are determined in accordance with the thus determined focal distance $f_3$.

Another factor which is to be taken into consideration is the measurable effective visible field, i.e. the prism amount which can be measured by the observation optical system.

Generally, the prism amount of the lens measurable in the field of vision in observation is between $10^\Delta$ and $12^\Delta$ as demanded in practice. This prism amount is substantially equal to the effective field of vision in the observation of the image on the screen through a magnifying optical system. This effective field of vision, however, is not always for both eyes but includes the single-eye field of left or right eye solely. The field of vision observable by two eyes is $5^\Delta$ to $6^\Delta$ by the prism amount.

The prism amount $\delta$ in observation by two eyes is determined in accordance with the following equation.

$$\delta = \frac{10^2}{f_2} \cdot \frac{PD(l - A) + \phi A}{\left(1 + \frac{A - l}{f_3}\right)} \quad (11)$$

In the foregoing description, $1^\Delta$ is determined as being $f_2/100$.

In the equation (11) above, the distance PD is selected to be 64 m/m which is a standard value for the distance between both eyes of an adult. The value given by the equation (7) is substituted for the $l-A$.

Then, the focal distance $f_3$ of the magnifying observation lens $L_3$ is determined for each case of $\phi=60$ m/m and $\phi=70$ m/m, with the condition of $\delta \geqq 6^\Delta$. Also, the magnification $m_2$ of the lens $L_3$ is determined with the condition $\delta \geqq 6^\Delta$. The result of the calculations are shown in Tables 2, 3 and 4.

The calculations were made with the focal distance $f_1$ of the collimater lens $L_1$ selected to be $f_1=25$ m/m and 30 m/m ($\phi=60$ m/m).

Also, the value of the focal length $f_2$ is determined with the values of $m_1$ in Table 1, and also from the equation (2).

Steps for Preparing Data in Tables 2, 3, 4

(1) As to the value of $f_2$, the condition for the effective diameter $\phi$ of $m_1$ of Table 1 is determined and the value of $f_1$ is inserted into an equation $f_3=m_1f_1$, which is a modification of equation (2), to calculate the lower limit of the focal length $f_2$. (Calculated on the condition of $m_1$ in Table 1).

The upper limit was set to 600 m/m with a view to reducing the size of the lens meter. Thus, in this case, the focal length $f_2$ was selected to be 450 m/m, 500 m/m, 550 m/m and 600 m/m.

(2) The value of the magnification $m_1$ was determined by inserting the conditions of $f_1=25$ m/m or 30 m/m into the equation (2), i.e. $m_1=f_2/f_1$.

(3) The lower limit of the magnification $m_2$ was determined by selecting the overall magnification M to be $M=30$ with the condition $m_2=M/m_1$, on consideration of the equations (1) and (2). The focal length $m_2$ can take any value between the thus obtained lower limit and the value determined by the condition of $\phi$ of $m_2$ in Table 1.

(4) As to the value of the focal length $f_3$, the equation (5) is developed for $f_3$ as follows:

$$f_3 = \frac{l(A - l)}{(m - 1)A}$$

and the condition of equation (7) is inserted into equation (7).

(5) The value of the focal length $f_3$ under the condition of $\delta \geqq 6\Delta$ is determined by developing the equation (11) for the focal length $f_3$ as $$f_3 = \frac{l \cdot f_2 \cdot \delta(A - l)}{\{PD(l - A) + \phi A\} \times 10^2 - \delta \cdot f_2 \cdot l}$$

and calculating with $\delta$ being equal to 6.

(6) The magnification $m_2$ under the condition $\delta \geqq 6\Delta$ is determined on the basis of the focal length $f_3$ determined in the preceding step (5), transforming this local length, in accordance with the equation (5), into the magnification of the lens $L_3$ which satisfies this focal length $f_3$.

(7) Finally, the values in the column M, showing the overall magnification M, were obtained by multiplying the values of $m_1$ with the values of $m_2$ determined in the step (6).

The following facts are seen from the Tables 2, 3 and 4.

(1) On condition of $\phi=60$ m/m and $f_1=25$ m/m (Table 2)

(1) The magnification $m_2$ of the magnifying observation optical system has an upper limit of 1.83, irrespective of the size of the objective lens $f_2$ of the projection optical system, if the condition of $\delta=6^\Delta$ is not taken into consideration. However, the focal length $f_2$ does not exceed 600 mm.

(2) Under condition of $\delta=6^\Delta$ or higher, the magnification $m_2$ must decrease as the focal length $f_2$ increases. The upper limit is 1.49 under the condition of $f_2=600$ m/m.

(3) The lower limit of the magnification $m_2$ decreases as the focal length $f_2$ increases.

(2) On condition of $\phi=60$ m/m and $f_1=30$ m/m (Table 3)

(1) When the focal length $f_1$ takes on a large value:
(a) The upper limit of $m_2$ is 1.83, irrespective of the value of $f_2$, when there is no requirement of $\delta=6^\Delta$ or greater. This coincides with the result shown in Table 2.

TABLE 2

| $f_2$ (m/m) | Magnification $m_1$ | Magnification $m_2$ | $\phi = 60$ m/m   $f_1 = 25$ m/m $f_3$ (m/m) | $f_3$ (m/m) under $\delta \geq 6^\Delta$ | $m_2$ under $\delta \geq 6^\Delta$ | Magnification |
|---|---|---|---|---|---|---|
| 450 | 18. × | 1.67–1.83 × | 90.36–111.94 | 90–111.94 | 1.67–1.83 × | 30–32.90 × |
| 500 | 20. × | 1.50–1.83 × | 90.36–150.00 | 104.65–150.00 | 1.50–1.72 × | 30–34.40 × |
| 550 | 22. × | 1.36–1.83 × | 90.36–208.33 | 128.57–208.33 | 1.36–1.58 × | 30–34.76 × |
| 600 | 24. × | 1.25–1.83 × | 90.36–300.00 | 158.82–300.00 | 1.25–1.49 × | 30–35.28 × |

(b) When there is a requirement of $\delta = 6^\Delta$ or greater, the magnification $m_2$ should fall within the range specified in the column "magnification $m_2$ under condition of $\delta \geq 6^\Delta$" of Table 3.

TABLE 3

| $f_2$ | $m_1$ | $m_2$ | $\phi = 60$ m/m   $f_1 = 30$ m/m $f_3$ | $f_3$ under $\alpha \geq 6^\Delta$ | $m_2$ under $\delta \geq 6^\Delta$ | M |
|---|---|---|---|---|---|---|
| 500 | 16.7 | 1.79–1.83 | 90.00–150.00 | 104.65–150.00 | 1.50–1.72 | 25.05–30.7 |
| 550 | 18.30 | 1.64–1.83 | 90.00–208.33 | 128.57–208.33 | 1.36–1.58 | 24.9–33.49 |
| 600 | 20.00 | 1.50–1.83 | 90.00–300.00 | 158.82–300.00 | 1.25–1.49 | 25–36.6 |

(2)(a) In some cases, the overall magnification M which is given as the product of the magnification specified in the "magnification $m_2$ under condition of $\delta \geq 6^\Delta$" and the magnification $m_1$ takes on a value smaller than 30 as will be seen from the column 30, when the lower limit of the magnification $m_2$ is adopted.

(b) It is, therefore, necessary to adopt the lower limit value of magnification $m_2$ specified in the column "$m_2$" of Table 3, as the lower limit value of the magnification $m_2$.

(3) Therefore, the magnification $m_2$ should fall within the following ranges:
(a) between 1.72 and 1.79 ($f_2 = 500$ m/m)
(b) between 1.58 and 1.64 ($f_2 = 550$ m/m)
(c) between 1.49 and 1.50 ($f_2 = 600$ m/m)

(3) On condition of $\phi = 70$ m/m and $f_1 = 25$ m/m (Table 4)

It will be seen that, in this case, the requirement of $\delta \geq 6^\Delta$ is met provided that the conditions of the equations (7), (8) and (9) are satisfied.

TABLE 4

| $f_2$ | $m_1$ | $m_2$ | $\phi = 70$ m/m   $f_1 = 25$ m/m $f_3$ | $f_3$ under $\alpha \geq 6^\Delta$ | $m_2$ under $\alpha \geq 6^\Delta$ | M |
|---|---|---|---|---|---|---|
| 450 | 18.00 | 1.67–1.71 | 105.6–111.94 | 60–111.94 | 1.67–2.25 | 30.06–40.5 |
| 500 | 20.00 | 1.50–1.71 | 105.6–150 | 71.4–150 | 1.50–2.05 | 30–41 |
| 550 | 22.00 | 1.36–1.71 | 105.6–208.33 | 84.6–208 | 1.36–1.89 | 29.92–41.58 |
| 600 | 24.00 | 1.25–1.71 | 105.6–300 | 95.5–300 | 1.25–1.78 | 30–42.72 |

In the projection type lens meter having a magnifying optical system, the following conditions from the view point of human engineering and the conditions of optical design must be met.

(1) Conditions of Human Engineering (1) The distance l between the lens $L_3$ of the magnifying observation system and the person to be examined:

$l = 300$ m/m (2) Distance A between the eye of the person to be inspected and the virtual image of the target formed on the same side of the lens $L_3$ as the object:

$A = 400$ m/m (2) Conditions of Optical Design (1) focal length of the collimeter lens:

$f_1 = 25$ m/m to 30 m/m (2) focal length of the objective lens of the projection optical system: $f_2 = 450$ to 600 m/m (3) effective diameter of the magnifying observation optical system: 60 m/m $\leq \phi \leq$ 80 m/m (4) prism amount in observation by two eyes:

$6^\Delta \leq \delta$ (5) Overall magnification M: $30x \leq M$

In order to satisfy all of the conditions mentioned above, it is necessary that the magnification of the magnifying observation optical system fall between 1.25 and 1.83.

By fulfilling this requirement, it is possible to produce a projection type lensmeter which is easy and comfortable to operate and manipulate and which has a field of vision and prism measurement amount which will meet those required in ordinary observation by two eyes.

Referring now to FIG. 2, there is shown a projection type lensmeter having the optical system which has been described above. The light from the light source LS is directed horizontally through a condenser lens 2 to a reflector 3 which functions to reflect the light upwardly. Above the reflector 3, there is provided a target support 5 which is mounted on a housing for vertical and rotating movements. The target support 5 is provided with a rack 5a which is in engagement with a pinion 6 adapted to be rotated by a handle 7. Thus, the target support 5 can be moved in the vertical direction by actuating the handle 7. The target support 5 is further provided at the lower portion with a gear 8 which is in engagement with an astigmatic axis handle (not shown) so that the support 5 is rotated by the handle.

In order to provide a digital indication of the orientation of the astigmatic axis, the target support 5 is provided with a gear 9 which is in engagement with a gear 12 which is in turn mounted on a shaft 11 of a potentiometer 10. The potentiometer 10 constitutes a portion of a suitable control circuit so that the orientation of the astigmatic axis can be designated in accordance with the resistance value of the potentiometer. A similar provision is provided for indicating the dioptral value in accordance with the resistance value of a potentiometer which varies in accordance with the vertical position of the target support 5.

The target support 5 has a vertically extending axial bore 5b and, in this axial bore 5b, there are provided the condenser lens C and the target T which are axially spaced apart one from the other. Above the target support 5, there is a lens mount 15 which has an axial bore 15a wherein the collimeter lens $L_1$ is disposed. On the lens mount 15, there is disposed the lens LT to be tested.

Above the lens mount 15, there is provided the objective lens $L_2$ which is coaxial with the lens LT. Mirrors 19, 20 and 21 are provided for directing the light which has passed through the objective lens $L_2$ toward the imaging screen S which is located beneath the reflector 3. The target image on the screen S is observed through the magnifying lens $L_3$.

We claim:

1. A projection type lens meter comprising: a lens mount for mounting a lens to be examined, a target-projecting optical system for projecting the target projection light through said lens on said lens mount and for magnifying and focussing said light on a screen, and an observation optical system for magnifying and observing the target image on said screen, said target-projecting optical system including a collimeter lens having a focal length $f_1$ and adapted to collimate said target projection light, and a projection lens having a focal length $f_2$ and adapted to project the target projection light beam on said screen, said observation optical system having an effective diameter $\phi$ and a magnification $m_2$, said focal lengths $f_1$, $f_2$, effective diameter $\phi$ and magnification $m_2$ satisfying the following relations of:

$25 \text{ mm} \leq f_1 \leq 30 \text{ mm}$ $409 \text{ mm} \leq f_2 \leq 600 \text{ mm}$ $60 \text{ mm} \leq \phi \leq 70 \text{ mm}$ $1.25 \leq m_2 \leq 1.83$ the overall magnification of said lens meter being 30 or greater.

* * * * *